United States Patent [19]

Smith

[11] Patent Number: 5,628,523

[45] Date of Patent: May 13, 1997

[54] TRANSPORTABLE DISPLAY STAND

[75] Inventor: Michael J. Smith, Orangeburg, N.Y.

[73] Assignee: Arrow Art Finishers, Inc., Bronx, N.Y.

[21] Appl. No.: 380,595

[22] Filed: Jan. 30, 1995

[51] Int. Cl.$^6$ .................................. B62B 1/12; B62B 1/16
[52] U.S. Cl. ............................. 280/47.26; 280/47.17; 280/645; 280/47.3
[58] Field of Search ........................ 280/47.17, 47.19, 280/47.26, 47.3, 47.32, 47.33, 78, 79.3, 645, 652, DIG. 3; 301/125

[56] References Cited

U.S. PATENT DOCUMENTS

| | | | |
|---|---|---|---|
| 778,200 | 12/1904 | Lev | 293/125 X |
| 3,279,811 | 10/1966 | Mitty et al. | 280/47.26 |
| 3,285,620 | 11/1966 | Mitty et al. | 280/47.26 |
| 3,292,942 | 12/1966 | Mitty et al. | 280/47.26 |
| 3,427,040 | 2/1969 | Jenkins | 280/47.26 X |
| 4,401,312 | 8/1983 | Parker | 280/47.17 |
| 5,125,675 | 6/1992 | Engelbrecht | 280/47.26 X |
| 5,443,168 | 8/1995 | Dyment et al. | 280/47.19 X |

*Primary Examiner*—Brian L. Johnson
*Assistant Examiner*—Avraham Lerner
*Attorney, Agent, or Firm*—Kirschstein et al.

[57] ABSTRACT

A transportable display stand includes a collapsible and erectable stand structure including a front wall, a rear wall, two side walls, and a bottom wall, and a roller assembly built into the stand structure. The walls constituting the stand structure are hingedly connected to one another for movement between their collapsed and erected positions in which they lie substantially flat against one another and extend substantially normal to each other, respectively. The roller assembly includes at least one roller mounted on a lower portion of the stand as considered in an erected condition of use of the stand on a horizontal support surface for displaying a plurality of items on display and at the rear wall for rotation about an axis parallel to the rear wall. The roller is disposed on the stand so as to be spaced from the support surface in the condition of use of the stand and in engagement with the support surface in a rearwardly tilted position of the stand.

14 Claims, 4 Drawing Sheets

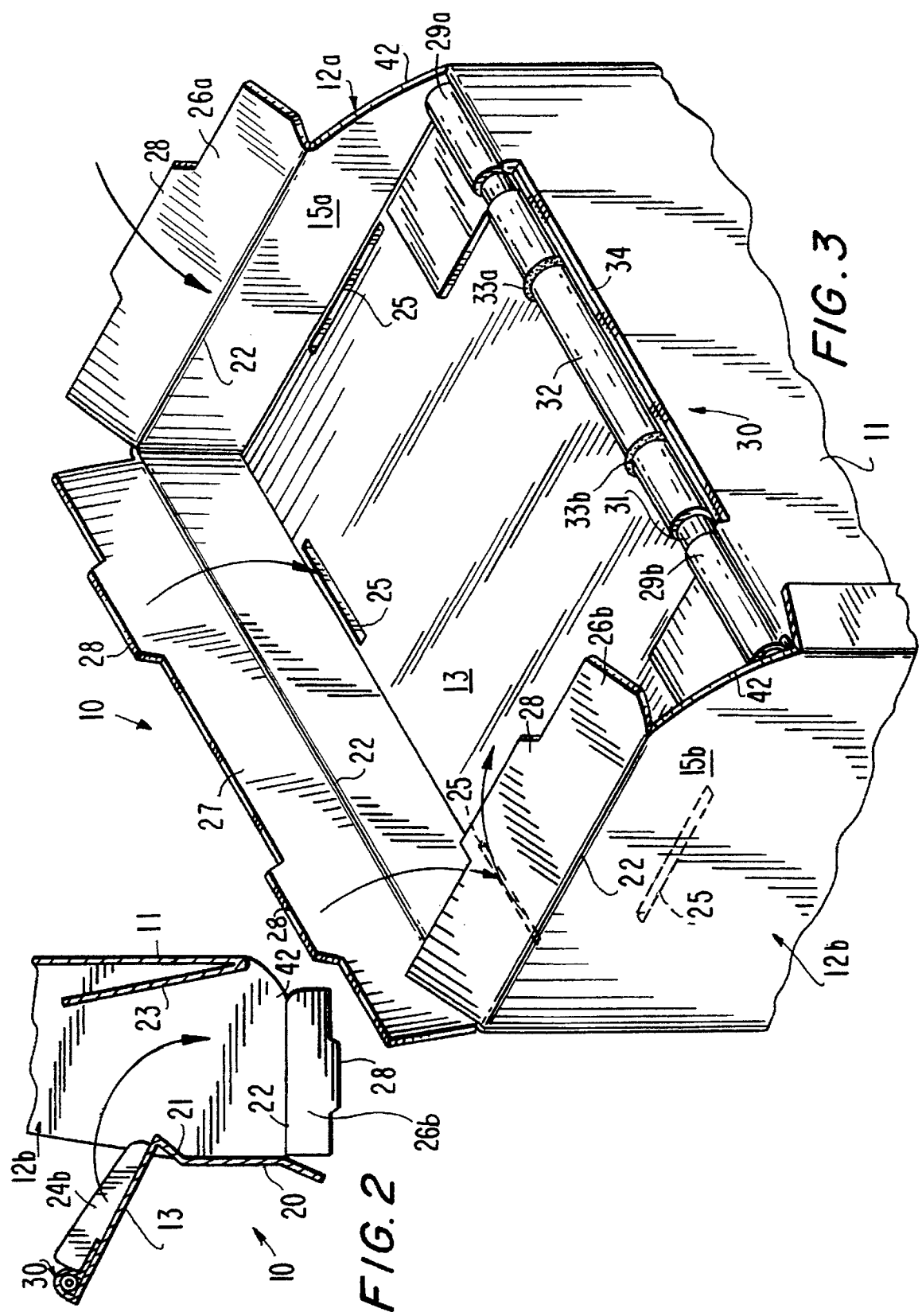

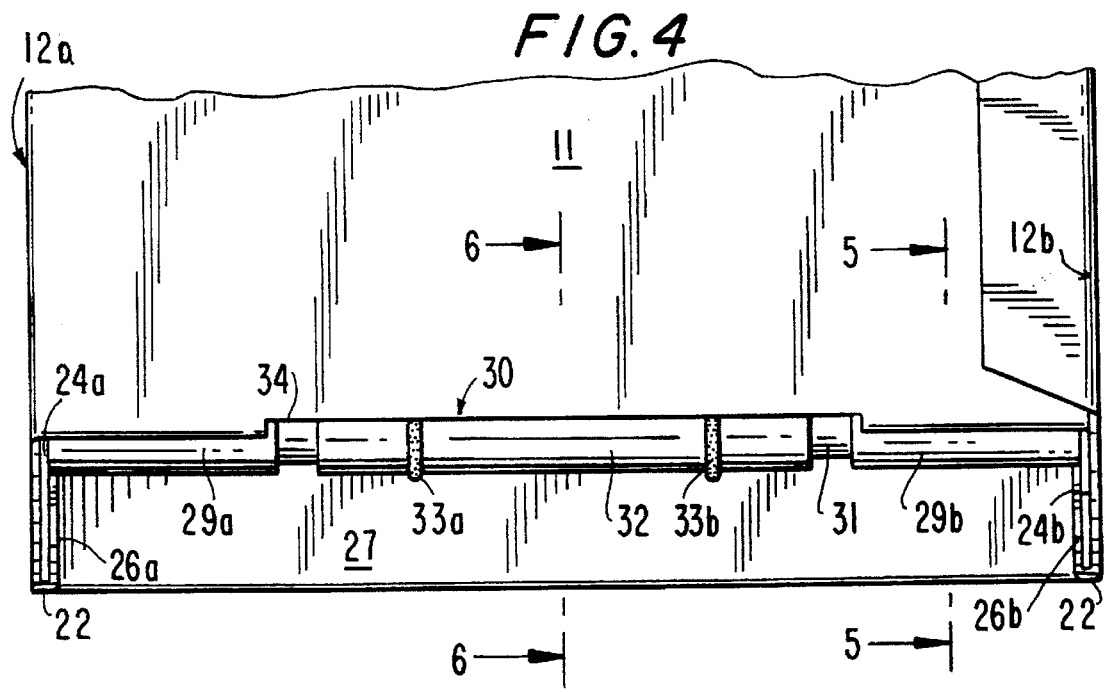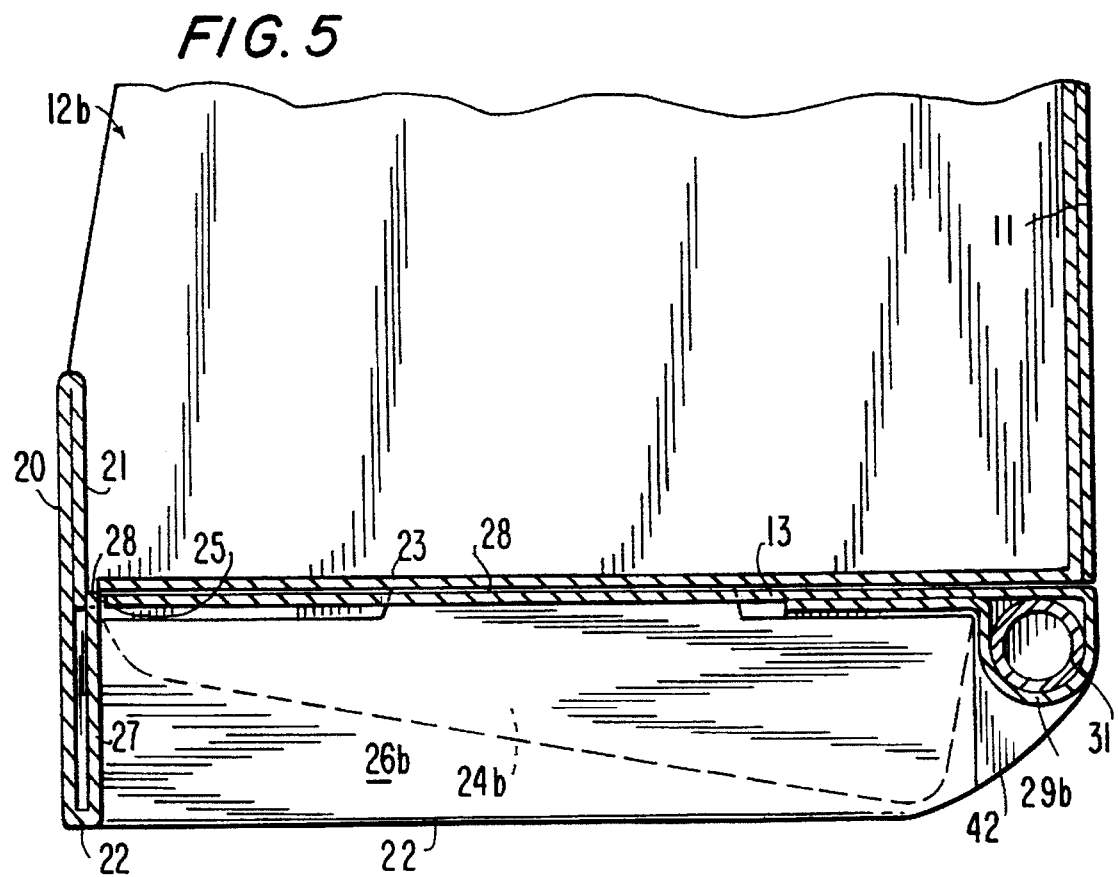

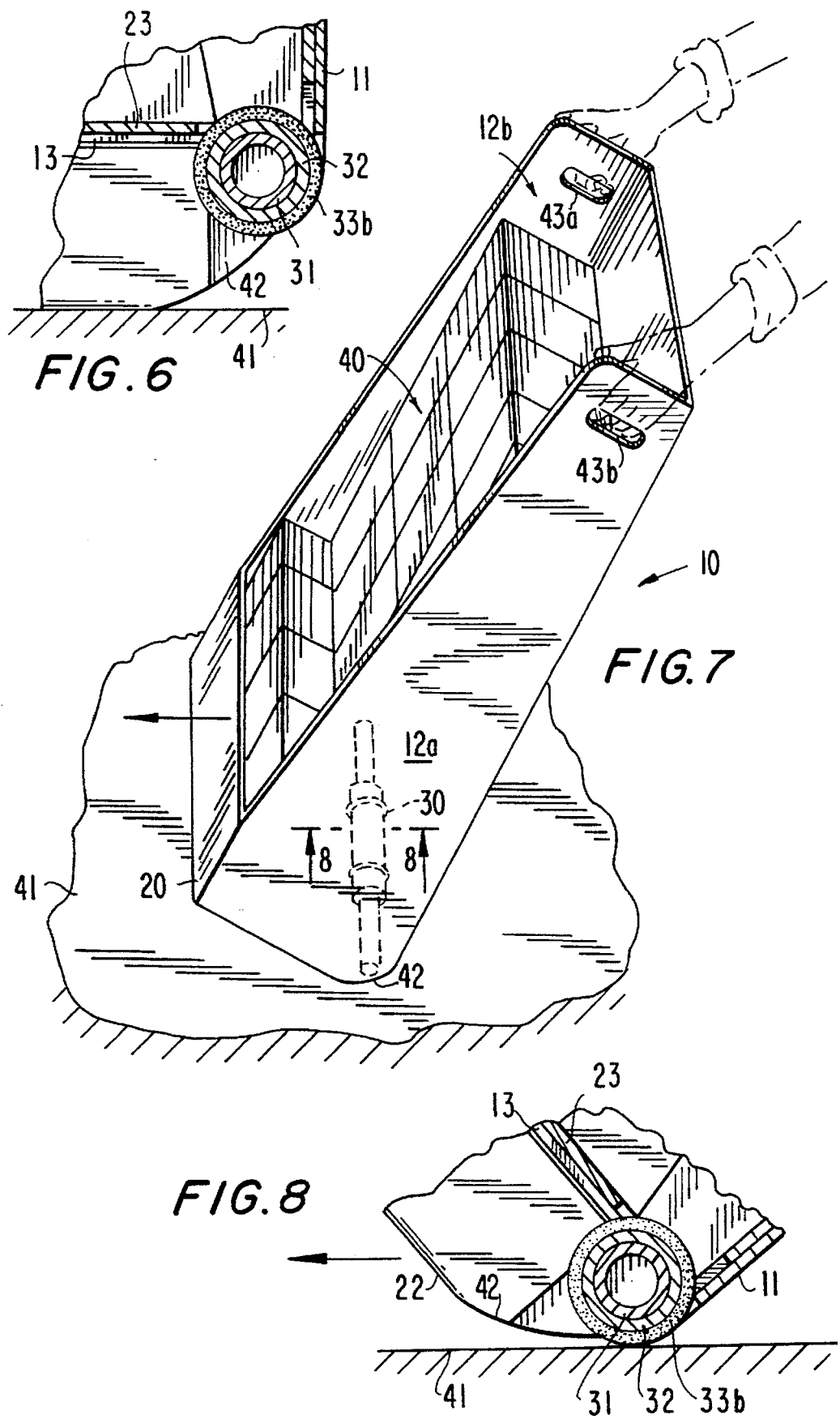

TRANSPORTABLE DISPLAY STAND

BACKGROUND OF THE INVENTION

1. Field of the Invention

The present invention relates to foldable display stands in general, and more particularly to an erectable display stand having its own built-in transportation equipment.

2. Description of the Related Art

There are already known various constructions of display stands, shopping carts, hand trucks and trolleys, among them such that are equipped or assemblable with their own transportation equipment, usually wheels, that are intended to be used for transporting the stand, together with its contents, over relatively short distances, such as from one store location to another. The provision of such built-in transportation equipment dispenses with the otherwise existing need for either unloading the stand before moving it, or having to use a separate multipurpose hand truck, dolly or similar equipment, which may or may not be readily available, for transporting the stand in its loaded condition. Examples of display stands of this kind and/or similar devices can be found in U.S. Pat. Nos. 3,292,942 to Mitty et al; 3,856,320 to Blanchard; 4,632,412 to Nasgowitz; and 5,125,675 to Engelbrecht.

It has been established that devices of this type, as advantageous as they may be in some respects, possess certain disadvantages as well. An important drawback encountered in such wheeled devices is that the devices themselves are often made of rigid, three-dimensional construction for strength purposes. Such devices are bulky and expensive to fabricate.

Other devices are erectable from a collapsed to an erect condition. Such erectable devices are disadvantageous in that laterally arranged wheels are used for the transportation equipment. For one, the wheels are evidently not intended to be removed while the device is standing still at a particular location, no matter how long it remains there. This brings about the danger that, since display stands are usually situated at high-traffic areas (to maximize exposure) where store patrons possibly pushing carts have to maneuver with care to avoid collision with other people or objects, the projecting wheels of the display stand may not be noticed, resulting in inconvenience at best or even in injury to the store patron.

On the other hand, the presence of the wheels detracts from compactness of the display stand in its collapsed condition if the stand is collapsible to begin with, inasmuch as the diameter of the wheels in all instances substantially exceeds the thickness to which the collapsible stand could be otherwise collapsed. This complicates the handling of the device even as it is being shipped to its intended destination prior to its actual use.

OBJECTS OF THE INVENTION

Accordingly, it is a general object of the present invention to avoid the disadvantages of the prior art.

More particularly, it is an object of the present invention to provide a transportable display stand that does not possess the drawbacks of the known display stands of this type.

Still another object of the present invention is to devise a transportable display stand of the type here under consideration which has its own built-in transportation equipment to be used for moving the stand in its loaded condition from one location to another.

It is yet another object of the present invention to design the above transportation equipment in such a manner as to facilitate the handling of the display stand both in its collapsed and fully erected condition and to minimize the potential for injury to people handling or present in the vicinity of the display stand.

A concomitant object of the present invention is so to construct the display stand with built-in transportation equipment of the above type so relatively simple in construction, inexpensive to manufacture, easy to use, and yet reliable in operation.

SUMMARY OF THE INVENTION

In keeping with the above objects and others which will become apparent hereafter, one feature of the present invention resides in a transportable display stand which includes a stand structure and a roller assembly built into the stand structure. The stand structure includes a front wall, a rear wall, two side walls, and a bottom wall, the walls being hingedly connected to one another for movement between their collapsed and erected positions in which they lie substantially flat against one another and extend substantially normal to each other, respectively. The stand structure has a lower portion and an upper portion as considered in an erected condition of use of the stand on a horizontal support surface for displaying a plurality of items on display. The roller assembly includes at least one roller permanently mounted on the lower portion of the stand at the rear wall for rotation about an axis parallel to the rear wall. The roller is disposed on the stand in such a manner as to be spaced from the support surface in the condition of use of the stand and in engagement with the support surface in a rearwardly tilted position of the stand.

In accordance with an advantageous aspect of the present invention, the bottom wall includes at least two journal bearings situated at regions of the bottom wall that adjoin the side walls in the erected positions of the walls. The roller assembly then further includes a shaft centered on a longitudinal axis and having respective longitudinally spaced mounting portions received in the journal bearings, and the at least one roller is mounted on the shaft intermediate the journal bearings for rotation about the longitudinal axis of the shaft.

Advantageously, the shaft has a tubular configuration throughout. It is also advantageous when the mounting portions of the shaft are received in the journal bearings with a frictional fit. Under these circumstances, the roller is preferably supported on the shaft for turning about the longitudinal axis relative thereto.

In further accordance with the present invention, the rear wall includes a cutout at a region thereof situated between the journal bearings in the erected positions of the walls to avoid interference of the rear wall with the rotation of the roller. The roller assembly advantageously further includes as least two O-rings supported on an outer circumferential surface of the roller at a longitudinal distance from one another.

It is also advantageous when, in accordance with another facet of the present invention, the lower portion of the stand structure is rounded at a transition region thereof between the side walls and the rear wall to facilitate the tilting of the stand structure and avoid interference with the support surface as the stand is being moved in the tilted position thereof on the roller assembly from one location to another. Last but not least, it is currently preferred to provide the side walls at the upper portion of the stand structure with respective handgrip openings for facilitating the tilting and maneuvering of the stand as it is being transported on the roller assembly from one location to another.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a sectional view taken through a bottom part of the transportable display stand of FIG. 1 during an initial phase of its erection;

FIG. 3 is a perspective view of the bottom part of the transportable display stand shown in FIG. 2, but in an upside down position and taken during the next phase of the stand erection operation;

FIG. 4 is a rear elevational view of the bottom part of the transportable display stand of FIG. 3 in its fully erected condition and shown in its right side up position;

FIG. 5 is a sectional view corresponding to that of FIG. 2 except for scale, taken on line 5—5 of FIG. 4 in the fully erected condition of the transportable display stand;

FIG. 6 is a sectional view akin to that of FIG. 5 but taken on line 6—6 of FIG. 4 and showing only a rear portion of the bottom part of the transportable display stand;

FIG. 7 is a perspective view from above of the transportable display stand of FIGS. 1 to 6 in its fully erected and loaded condition and in its transportation position; and FIG. 8 is a view similar to that of FIG. 6, but taken on line 8—8 of FIG. 7 to show the affected rear portion of the transportable display stand in its transportation position.

DETAILED DESCRIPTION OF THE PREFERRED EMBODIMENT

Figure 1:
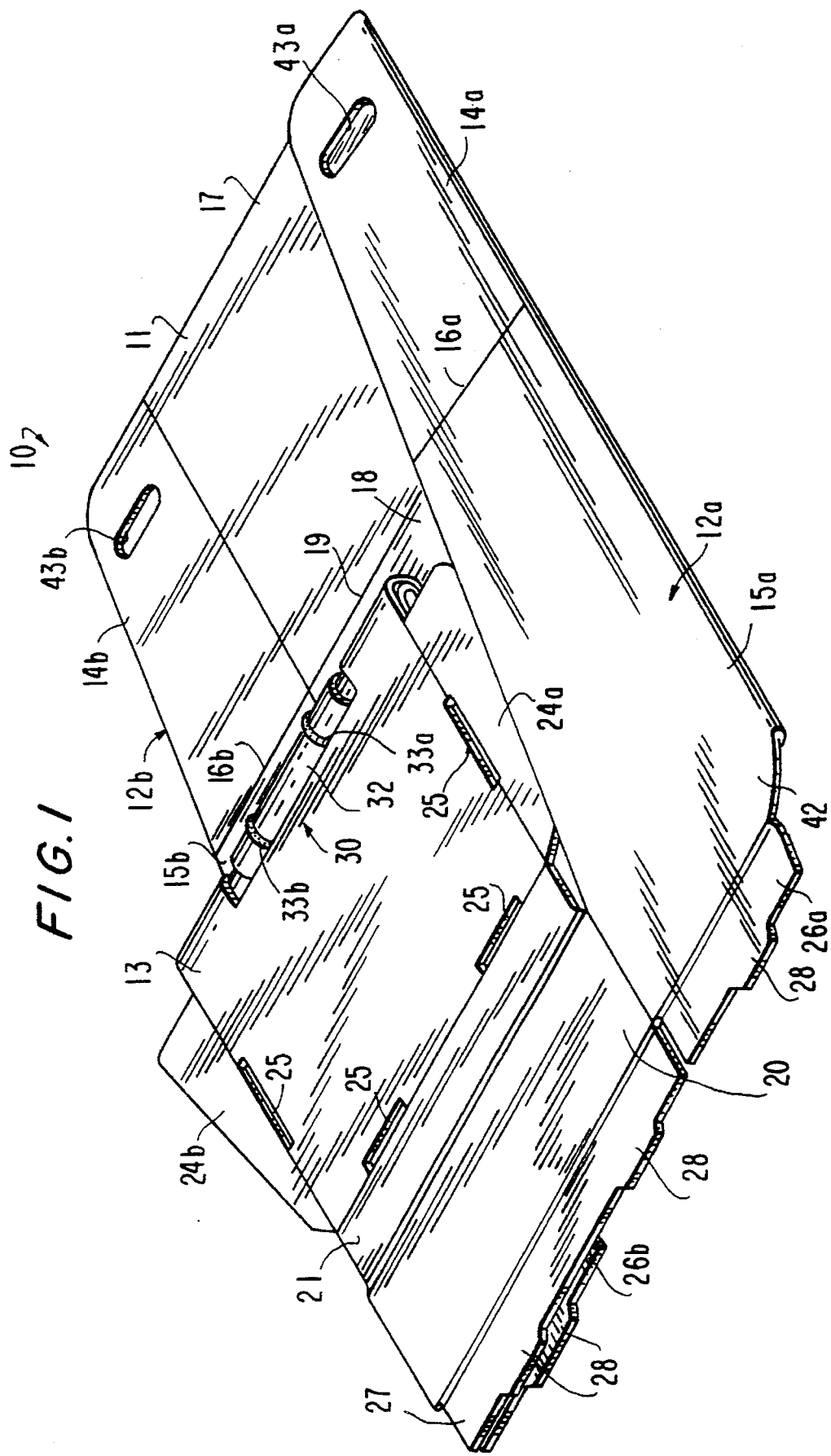
FIG. 1 is a perspective view of a transportable display stand of the present invention in its folded and collapsed condition, with a bottom wall on top and a rear wall at the bottom.

Referring now to the drawing in detail, and first to FIG. 1 thereof, it may be seen that the reference numeral 10 has been used therein to identify a transportable display stand of the present invention in its entirety. The display stand 10 includes, as its main structural components, a rear wall 11, two side walls 12a and 12b that are shown to be folded on top of, and into the plane of the rear wall 11, respectively, in the collapsed or folded condition of the display stand 10 that is depicted in FIG. 1, and a bottom wall 13 shown to be folded on top of the collapsed side walls 12a and 12b.

In the illustrated implementation of the present invention, each of the side walls 12a and 12b consists of two sections 14a and 15a or 14b and 15b hingedly connected with one another by a crease zone or line 16a or 16b, respectively, and the rear wall 11 includes two sections 17 and 18 joined by another crease zone or line 19. The crease zones 16a, 16b and 19 are juxtaposed and/or aligned with one another so as to enable the sections 14a, 14b and 17 to be folded about them with respect to the sections 15a, 15b and 18, typically in the back of the latter as indicated by an arrow, to give the folded display stand 10 a particularly compact configuration.

The side walls 12a and 12b, and more particularly the lower sections 15a and 15b thereof, are interconnected by a front wall 20 that rises to only a fraction of the height of the lower sections 15a and 15b and has the bottom wall 13 hingedly connected thereto via a connecting portion 21. At this junction, it is to be mentioned that all references being had herein to relative locations or directions, such as "upper", "lower", "front", "rear", etc., unless indicated otherwise, are with respect to the orientation the transportable display stand 10 assumes when erected and in use, as considered from the direction in which it is most likely to be viewed by an observer.

Besides the components discussed above, the transportable display stand 10 further includes additional components that will be introduced and discussed in some detail as this description proceeds. At this juncture, it is sufficient to mention that, in accordance with the present invention, the bottom wall 13 is provided with an integrated roller assembly 30, the construction and operation of which will also be explained later in conjunction with a discussion of the display stand 10 in its unfolded and erected condition or orientation.

As consideration of FIG. 2 of the drawing will reveal, the display stand erection process is commenced by placing the respective adjacent ones of the front, rear and side walls 20, 11, 12a, and 12b in substantially orthogonal relationship with respect to one another. Thereafter, the bottom wall 13 and the connecting portion 21 are pivoted in a manner indicated by an arrow in FIG. 2 from their positions in front of the box-like structure constituted by the erected walls 20, 11, 12a and 12b into the interior of such partially erected structure.

When this phase of the erection process is completed, the roller assembly 30 is situated at what is to become a bottom edge 22 of the display stand 10 in its fully erected position of use, and the connecting portion 21 holds the front portion of the bottom wall 13 at a predetermined elevation above the prospective bottom edge 22, this elevation (i.e. the width of the strip-shaped connecting portion 21) being chosen in such a manner that the bottom wall 13 extends substantially parallel to a store floor or a similar horizontal support surface when the bottom edge 22 of the fully erected stand 10 rests on such support surface and the roller assembly 30 is in contact with the support surface as well.

It may also be discerned in FIG. 2 of the drawing that there is further provided a supporting wall or shelf panel 23 that is hingedly connected at its bottom region to the rear wall 11 and assumes its illustrated upturned position before and during the introduction of the bottom wall 13 into the aforementioned partially erected structure to be lowered after the conclusion of this procedure and rest on the bottom wall 13 in area contact therewith. As will become clearer later, it is on this support wall 23, rather than directly on the bottom wall 13, where the items on display on the stand 10 are supported in the use position of the display stand 10. Yet, the cooperation of the two walls 13 and 23 with one another effectively doubles the load-carrying capacity of the display stand bottom that is constituted by such walls 13 and 23.

As a comparison of FIGS. 1 and 2 of the drawing will reveal, the bottom wall 13 is provided with two lateral flaps 24a and 24b that are substantially coplanar with the bottom wall 13 in the folded or collapsed position of the display stand 10 that is shown in FIG. 1 and extend in substantial parallelism and area contact with the respective associated ones of the side walls 12a and 12b, downwardly from the bottom wall 13 in the final erected condition of the display stand 10. These lateral flaps 24a and 24b confine the aforementioned support wall 23 between themselves, thus further enhancing the stability and load-carrying capability of the display stand bottom.

FIG. 3 of the drawing shows that the bottom wall 13 is provided with respective slots 25 that are strategically distributed close to three of the edges of the bottom wall 13, that is, at those regions at which the bottom wall 13 is hingedly connected with the lateral flaps 24a and 24b and the connecting portion 21, none of which is visible in FIG. 3 because they are obscured from view by the bottom wall 13. The side walls 12a and 12b and the front wall 20 have respective flaps 26a, 26b and 27 connected to their lower regions for pivoting as indicated by the arrows, to collectively form the bottom edge 22 when in their fully pivoted positions. The flaps 26a, 26b and 27 are provided with respective tongues 28 that are inserted into the associated ones of the slots 25 to lock the flaps 26a, 26b and 27 in position, whereupon the flaps 26a, 26b and 27 serve as peripheral supports for the bottom wall 13.

As mentioned before, the bottom wall 13 carries the roller assembly 30. As may be ascertained from comparing FIGS. 3 to 6 of the drawing with one another, the roller assembly 30 includes as its main components a tubular shaft 31 and a roller 32 supported on the shaft 31 for rotation about its axis. The end portions of the shaft 31 are supported in respective journal bearings 29a and 29b that are constituted by integral portions of the bottom wall 13 that are bent back to surround the respective end portion of the shaft 31 and are connected, either by stapling or by glueing, to the bottom wall 13 at their respective remote end portions.

Preferably, the journal bearings 29a and 29b receive the respective end portions of the shaft 31 with a frictional fit so that the shaft 31 does not turn about its longitudinal axis; only the roller 32 does. The roller 32 carries on its outer periphery at least two O-rings 33a and 33b of elastomeric material, such as vulcanized rubber. The rear wall 11 is optionally provided at a region between the two journal bearings 29a and 29b with a cutout 34 that eliminates the possibility of interference of the rear wall 11 with the turning movement of the roller 32 and the O-rings 33a and 33b about the longitudinal axis of the shaft 31.

Having so described most of the details of construction of the display stand 10 and its roller assembly 30, the operation and cooperation thereof will now be discussed with particular reference to FIGS. 6 to 8 of the drawing. As indicated in FIG. 7, the display stand 10 in its fully erected condition is used to display a multitude of items collectively identified by the reference numeral 40. These items 40 are stacked on top of each other in several tiers, so as to more or less fill the space bounded by the stand 10. The position shown in FIG. 7 is not that in which the stand 10 is ordinarily found on a store floor 41 or a similar horizontal surface, however; rather, the stand 10 has been tilted by store personnel out of that substantially upright ordinary position in which the roller assembly 30 is disposed remotely from the floor 41 as shown in FIG. 6 into a backwardly inclined position, to such an extent that the O-rings 33a and 33b of the roller 32 come into engagement with the floor 41 as indicated in FIG. 8, the entire weight of the display stand 10 and of its contents 40 resting thereon.

To render possible and facilitate this tilting movement, a bottom rear region of the stand 10 is rounded as indicated at 42. It may be seen especially in FIG. 8 that, were it not for the rounding of the bottom rear region 42, such region of the stand 10 would interfere with the movement of the stand 10 on the floor 41. It may also be seen in FIG. 7 that the side walls 12a and 12b are provided at their upper regions with respective handgrip openings 43a and 43b that enable the store personnel to grip the stand 10 by the side walls 12a and 12b by inserting his or her fingers into the openings 43a and 43b. This helps substantially not only during the tilting of the stand 10 but also, and possibly more importantly, during the maneuvering of the stand 10 as it is being transported on the roller assembly 30 on the store floor 41 from one location to another.

The roller assembly 30 is entirely located between the side walls 12a, 12b, and its maximum diameter or cross-section does not exceed the overall thickness of the collapsed stand. The stand can be shipped in the collapsed condition with the roller assembly pre-mounted. Erection of the wheeled stand is greatly simplified over the art.

It will be understood that each of the elements described above, or two or more together, may also find a useful application in other types of constructions differing from the type described above.

While the present invention has been described and illustrated herein as embodied in a specific construction of a transportable display stand, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A transportable display stand comprising:
   a) a stand structure including a front wall, a rear wall, two side walls, and a bottom wall, said walls being hingedly connected to one another for movement between their collapsed and erected positions in which they lie substantially flat against one another and extend substantially normal to each other, respectively, said stand structure having a lower portion and an upper portion as considered in an erected condition of use of the stand on a horizontal support surface for displaying a plurality of items on display, said bottom wall having looped journal bearings spaced apart along, and integral with, said bottom wall; and
   b) a roller assembly built into said stand structure and mounted on said bottom wall for joint movement therewith, said roller assembly including a shaft and at least one roller mounted on said shaft at said lower portion of said stand at said rear wall for rotation about an axis parallel to said rear wall, said shaft having mounting portions respectively mounted in said journal bearings, said roller being supported by said shaft and by said journal bearings at an elevated position spaced from the support surface in said condition of use of the stand and in engagement with the support surface in a rearwardly tilted position of the stand.

2. The transportable display stand as defined in claim 1, wherein said journal bearings are situated at end regions of said bottom wall that adjoin said side walls in said erected positions of said walls; and wherein said at least one roller is mounted on said shaft intermediate said journal bearings.

3. The transportable display stand as defined in claim 2, wherein said shaft has a tubular configuration throughout.

4. The transportable display stand as defined in claim 2, wherein said mounting portions of said shaft are received in said journal bearings with a frictional fit; and wherein said roller is supported on said shaft for turning about said longitudinal axis relative thereto.

5. The transportable display stand as defined in claim 2, wherein said rear wall includes a cutout at a region thereof situated between said journal bearings in said erected positions of said walls to avoid interference of said rear wall with the rotation of said roller.

6. The transportable display stand as defined in claim 1, wherein said roller assembly further includes as least two O-rings supported on an outer circumferential surface of said roller at a longitudinal distance from one another.

7. The transportable display stand as defined in claim 1, wherein said lower portion of said stand structure is rounded at a transition region thereof between said side walls and said rear wall to facilitate the tilting of said stand structure and avoid interference with the support surface as the stand is being moved in said tilted position thereof on said roller assembly from one location to another.

8. The transportable display stand as defined in claim 1, wherein said side walls are provided at said upper portion of said stand structure with respective handgrip openings for facilitating the tilting and maneuvering of the stand as the strand is being transported on said roller assembly from one location to another.

9. The transportable display stand as defined in claim 1; and further comprising a generally planar shelf in surface-to-surface area contact with said bottom wall.

10. The transportable display stand as defined in claim 1, wherein said mounting portions of said shaft are in engagement with said bottom wall.

11. The transportable display stand as defined in claim 1, wherein said journal bearings have outer open axial faces that are overlaid by said side walls.

12. The transportable display stand as defined in claim 1, wherein said roller is supported underneath said bottom wall and inwardly of said rear wall.

13. The transportable display stand as defined in claim 1, wherein said bottom wall has lateral flaps in engagement with said side walls.

14. The transportable display stand as defined in claim 1, wherein said front wall and said side walls include respective peripheral supports for supporting said bottom wall from below.

* * * * *